May 24, 1966     YEN-TI HUANG     3,252,339
GYROSCOPIC APPARATUS
Filed Feb. 19, 1963
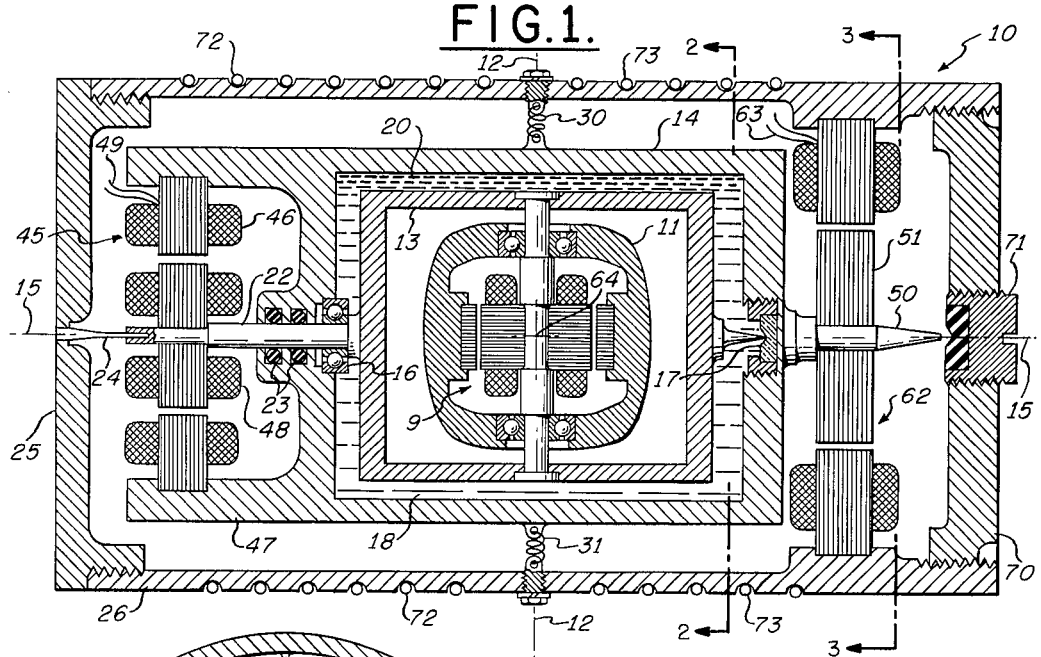
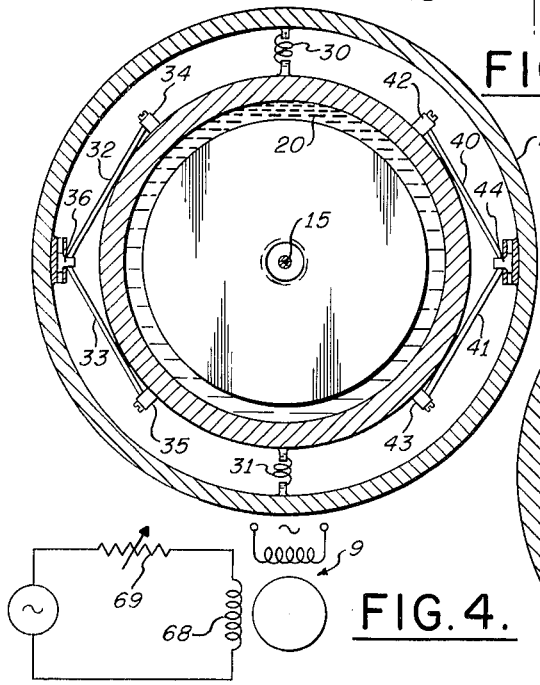
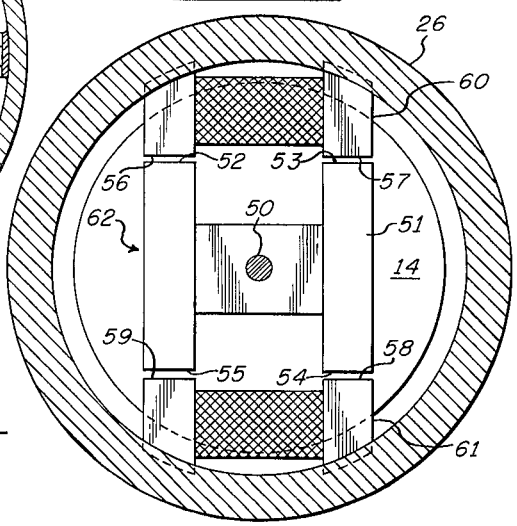
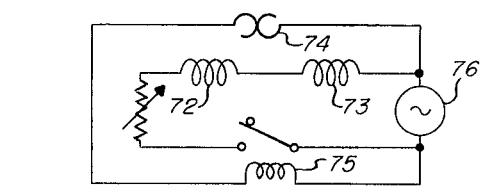
INVENTOR.
YEN-TI HUANG
BY
*H.P. Terry*
ATTORNEY

United States Patent Office 3,252,339
Patented May 24, 1966

---

3,252,339
GYROSCOPIC APPARATUS
Yen-ti Huang, Framingham, Mass., assignor to Sperry Rand Corporation, Great Neck, N.Y.
Filed Feb. 19, 1963, Ser. No. 259,614
15 Claims. (Cl. 74—5.6)

This invention relates to gyroscopic apparatus for measuring both angular and linear movements of a body upon which the gyroscopic apparatus is mounted.

For navigation and stabilization of aircraft and missiles, it is desirable to accurately sense the angular and linear movements of the craft. The apparatus of the present invention is particularly well adapted to provide measures representative of both angular and linear movements of a craft by means of a single instrument which combines the functions of a gyroscope and a pendulous mass.

The present invention is also suitable for seismological sensing for providing measurements of the motion of the earth. For seismological purposes, recordings are usually taken at seismic piers which respond to earth movement due to man-made explosions, volcanic action or earthquakes.

The motion of a seismic pier is essentially a rigid body movement which is composed of linear and angular displacements. The motion of the seismic pier is a result of the transmission through the earth of two different types of wave motions known as pressure (P) waves and shear (S) waves. When a P-wave presses a particle, that particle vibrates in the direction of travel of the wave whereas when a S-wave presses a particle, the particle is displaced at right angles to the direction of the travel of the wave. The travel of the P and S waves through the earth results in linear and angular movement of a seismic pier. Seismic sensors mounted on seismic piers sense the motion of the pier and provide a signal representative thereof generally for recording purposes. Previously, seismic sensors provided a measure of the translation or linear displacement of the seismic pier and the separation of angular rotation from translation has not been successful.

The present invention senses not only the translation of the seismic pier but is able to sense the rotation of the seismic pier and due to its gyroscopic characteristics, it is able to amplify this signal since the gyroscopic torque developed is directly proportional to the product of the gyro spin velocity and the rate of precession, the latter being caused by the rotation of the seismic pier in this instance. The type and degree of sensitivity capable of being attained by the present invention is considerably improved from that attained in known seismic sensors.

Another problem inherent in the prior art devices, particularly those for seismic application, is that the natural frequency of the sensor cannot be readily changed, for example, to accommodate long period detection. In the present invention the natural frequency of the sensor can be varied by changing the gyro spin velocity or the viscosity of the damping fluid depending upon the frequency range to be detected.

It is an object of the present invention to provide gyroscopic apparatus for measuring both angular and translational movements.

It is an additional object of the present invention to provide a gyroscopic apparatus for measuring both angular and linear movements in which the natural frequency thereof may be varied.

It is a further object of the present invention to provide a gyroscopic apparatus for measuring both rotational and translational movements which is highly sensitive, rugged and reliable in operation.

These and other objects are achieved by means of the present invention which includes a highly sensitive gyroscope responsive to rotational movements. The gyroscope is supported in cantilevered fashion to provide a seismic mass by means of which translational movements may be accurately measured. By varying either the gyro spin velocity or the fluid viscosity, the natural frequency of the gyroscopic apparatus may be varied to accommodate the frequency range of interest.

Various other objects and advantages of the present invention will be apparent from the following detailed description taken in conjunction with the accompanying drawings in which:

FIG. 1 is a longitudinal cross-sectional view of a gyroscopic apparatus;

FIG. 2 is a section of FIG. 1 taken along the line 2—2;

FIG. 3 is a section of FIG. 1 taken long the line 3—3;

FIG. 4 is a schematic wiring diagram for varying the spin velocity of the gyro rotor; and FIG. 5 is a schematic wiring diagram for varying the viscosity of the damping fluid by means of a temperature control system.

For purposes of example, the present invention will be described with respect to gyroscopic apparatus suitable for seismic sensing purposes. It will be appreciated, however, that gyroscopic apparatus of this type is suitable for other applications as well.

Referring now to FIG. 1, a gyroscopic apparatus 10 is shown having a gyroscopic rotor 11 which is driven by an electric motor 9 to rotate about a spin axis 12 within an inner hollow cylindrical casing 13. The case 13 in turn is rotatably supported within an intermediate hollow cylindrical casing 14 for pivoting about a longitudinal or output axis 15 by means of ball bearing 16 and jewel bearing 17. The intermediate casing 14 has its longitudinal axis coaxial with that of the inner casing 13. The exterior dimensions of the inner casing 13 are slightly smaller than the corresponding interior dimensions of the intermediate casing 14 resulting in a space 18 therebetween. The space 18 is filled with a viscous fluid 20 which is sealed within the intermediate casing 14 and serves as a viscous damper for gyroscopic torques and as a supporting fluid to minimize the frictional torques induced by the bearings 16 and 17. The fluid 20 also acts as a shock absorber and protects the gyroscopic rotor 11.

A shaft extension 22 of the inner casing 13 extends along the axis 15 from one extremity of the inner casing 13 through a fluid seal 23 in the intermediate casing 14. A fatigue resistant flat band spring 24 has one end connected to the shaft extension 22 and its other end connected to the center of an end circular plate 25 of a hollow cylindrical housing 26 for resiliently supporting the intermediate casing 14 in cantilevered fashion within the housing 26 and for providing a resilient restraining force for the rotor 11 around the axis 15. The portion of the shaft 22 adjacent the bearing 16 may form the inner race of the bearing 16, if desired. The housing 26 has its longitudinal axis coaxial with that of the intermediate casing 14 and the axis 15 in the condition shown in FIG. 1.

The intermediate casing 14 is resiliently suspended for limited movement within the housing 26 by diametrically opposed helical springs 30 and 31. As viewed in FIGS. 1 and 2, the upper extremity of the helical spring 30 is connected to the inner surface of the housing 26 while the lower extremity is connected to the outer surface of the intermediate casing 14. Similarly, the upper extremity of the spring 31 is connected to the outer surface of the intermediate casing 14 while the lower extremity is connected to the interior surface of the housing 26. The springs 30 and 31 are spaced on opposite sides of the intermediate casing 14 along a diameter defined by the axis 12, for example.

To provide the gyroscopic apparatus 10 with single degree of freedom characteristics, a pair of thermally stable alloy bands 32 and 33 shown in FIG. 2 are connected to the outer surface of the intermediate casing 14 at spaced points 34 and 35, respectively and joined at common point 36 on the inner surface of the housing 26 and another pair of thermally stable alloy bands 40 and 41 are similarly connected to spaced points 42 and 43, respectively, on the outer surface of the intermediate casing 14 and to a common point 44 on the inner surface of the housing 26. The points 36 and 44 are diametrically opposed. The points 36 and 44 are slotted or sliding joints depending upon the order of magnitude of spring displacement expected to be experienced by the springs 30 and 31. The points where the springs 30 and 31 connect to the interior surface of the housing 26, the points 36 and 44, the points where the springs 30 and 31 connect to the outer surface of the inner casing 14, and the points 34, 35, 42 and 43 are all preferably disposed in a common plane that is perpendicular to the axis 15.

An angular resolver or pick-off 45 has its stator 46 connected to a wall extension 47 of the intermediate housing 14 and its rotor 48 mounted on the shaft extension 22 for rotation therewith in order to provide a signal from the stator 46 on leads 49 representative of the angular movement of the inner casing 13 with respect to the intermediate casing 14 as a result of precession of the rotor 11. Preferably, the signal from the pick-off 45 has an amplitude and phase representative of the magnitude and direction of the movement of the inner casing 13 with respect to the intermediate casing 14.

To provide a signal representative of the linear acceleration experienced by the gyroscopic apparatus 10, the other end of the intermediate casing 14 has a coaxial shaft extension 50 upon which an H-shaped magnet 51 is mounted. As shown more clearly in FIG. 3, the extremities 52, 53, 54, and 55 of the H-shaped magnet 51 are cooperative with respective extremities 56, 57, 58, and 59 of stators 60 and 61 to form a linear pick-off 62. The stators 60 and 61 are mounted on the interior surface of the housing 26 to be cooperative with the magnet 51 in order to provide a signal on the output leads 63 representative of the displacement of the intermediate casing 14 with respect to the housing 26 in the direction of the axis 12. Preferably, the signal from the pick-off 62 has an amplitude and phase representative of the magnitude and direction of the displacement of the intermediate casing 14 with respect to the housing 26. It will be appreciated that the seismic or pendulous mass of the apparatus 10 includes all of the elements mounted upon and within the intermediate casing 14 including the heavy spinning gyroscopic rotor 11.

In the embodiment of the invention shown in FIG. 1, it is advisable to maintain the operating temperature at a predetermined constant value and it is also desirable to minimize temperature gradients particularly through the viscous fluid 20. For this purpose the gyroscopic apparatus 10 is temperature controlled in a manner to be described. A feature of the present invention is that the temperature gradients which may appear in the viscous fluid 20 are attenuated by means of the centrally located heat dissipating springs 30 and 31 and bands 32, 33, 40 and 41. These elements tend to provide a thermal passage for the heat from the viscous fluid 20 through the intermediate casing 14 to the outer housing 26 and since they are centrally disposed, they tend to maintain the temperature uniform through the fluid 20.

In operation the gyroscopic apparatus 10 is mounted, for example, on a seismic pier and levelled by conventional means not shown. When a wave is transmitted through the earth which causes angular rotation of the seismic pier about the input axis 64 of the apparatus 10 which is perpendicular to the axes 12 and 15, the spinning rotor 11 will precess around its output axis 15. This movement tends to be counteracted by the viscous fluid 20 and the torsional resilient force of the flat spring 24. The angular rotation of the inner casing 13 caused by precession of the rotor 11 rotates the rotor 48 of the pick-off 45 relative to its stator 46 thereby providing an electrical signal on the leads 49 representative of the magnitude and direction of the angular movement of the seismic pier which is directly related to the wave which caused the movement.

Translation of the seismic pier in the direction of the axis 12 as a result of an acceleration in that direction tends to cause the seismic mass within the intermediate casing 14 to remain stationary while the housing 26 moves with the seismic pier. The intermediate casing 14 pivots upon the flat spring 24 against the resilient force of the springs 30 and 31. This produces an output signal from the pick-off 62 representative of the magnitude and direction of the acceleration experienced by the seismic pier along the axis 12 that is directly related to the wave which caused the movement. The signals from the leads 49 and 63 may then be applied to seismic recording instruments for the usual purposes of analysis.

With three gyro-seismometers of the type shown in 10 having their spin axis orthogonally disposed on a common seismic pier, information is obtainable relating to the movement of the seismic pier about its three axes of movement thereby providing the information required to solve equations relating to seismic movements of the earth. It will be noted that by means of the present invention the separation of angular and linear movements is accomplished readily and accurately by extremely simple, rugged, reliable and compact apparatus.

The sensitivity and frequency response of the present invention may be controlled by adjusting the spin velocity of the rotor 11 by means of the circuit shown in FIG. 4 in which the current to the control field winding 68 of the rotor motor 9 is varied by means of a variable resistance 69 in accordance with the frequency response desired. The same result can also be attained by varying the viscosity of the the damping fluid 20 by controlling its temperature. This may be accomplished by means of an adjustable temperature regulating system shown in FIG. 5 in which resistive heating wires 72 and 73 are wound around the housing 26 of FIG. 1 in circumferential grooves. The temperature of the damping fluid 20 is controlled by an adjustable thermocouple or thermostat 74 which energizes a relay 75 to thereby regulate the current from a power source 76 to the heating wires 72 and 73 for maintaining the desired viscosity. Thus, the sensitivity of the apparatus 10 can be altered by changing the rotor spin velocity, the rotor inertial characteristics, or the characteristics of the viscous fluid 20. Further, the natural frequency of the gyroscopic apparatus 10 can be varied since it is a function of the spin velocity, viscosity, and the structural configuration. This results in two important advantages: (1) arbitrary control of the natural frequency is possible even after the instrument is constructed and installed, which is not possible with conventional seismic sensors, and (2) the frequency response characteristics can be varied thus providing the possibility of the same set of instruments being readily adapted for different purposes.

Although the gyroscopic rotor 11 is driven by an electrical motor, it may be desirable in certain applications to utilize a fluid sphere type of gyro as shown in U.S. Patent No. 3,058,359, issued October 16, 1962 to W. G. Wing entitled "Fluid Rotor Gyroscopic Apparatus." Alternatively, a hydrodynamic or hydrostatic supported rotor may be utilized of the type shown in U.S. Serial No. 232,713 entitled "Gyroscopic Apparatus" filed October 24, 1962 in the name of Gordon J. Watt.

For purposes of simplicity, the pick-off 45 has been shown merely as a pick-off. In actual practice, it may be desirable to utilize a combination pick-off and torquing device of the type disclosed in U.S. Patent No. 3,089,044 entitled, "Electromagnetic Transducer Device," of of Robert H. Bolton, issued May 7, 1963. Utilizing a combination pick-off and torquing device of this nature, it may, for example, be completely immersed in the damping fluid 20 to provide a signal from the pick-off portion representative of the relative movement between the inner casing 13 and the intermediate casing 14 while a torque may be applied by means of the torquer portion of positioning the inner casing 13 and thus return the spin axis 12 to a desired orientation. Further, the inner casing 13 may then be pivotably mounted on spaced jewel bearings within the intermediate casing 14 for rotation about the axis 15 thereby eliminating the ball bearing 16 and the frictional effects associated therewith. In this configuration the flat spring 24 would provide resilient restraint in the direction of the axis 12 and it would not necessarily provide torsional resilient restraint around the axis 15 since this function would now be accomplished by means of the viscous damping fluid 20 and the torquer portion of the combined pick-off and torquer combination.

To prevent damage to the apparatus 10 when shipping and to prevent foreign matter from entering the cavity within the housing 26, a flat circular end plate 70 encloses the opening of the housing 26 adjacent the pick-off 62. Preferably, the center of the plate 70 is constructed in such a way as to receive the extremity of the shaft 50 by means of a recessed adjustable bolt 71 of the casing 14 prior to the time that the apparatus 10 is placed in operation.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. Gyroscopic apparatus for measuring first and second types of movements of a body comprising,
   (1) gyroscopic means mounted on and responsive to said first type of movement of said body for providing a first relative movement in accordance therewith,
   (2) first pick-off means having one portion connected to said gyroscopic means and responsive to said first relative movement for providing a signal in accordance with said first type of movement,
   (3) means including an inertial mass mounted on and responsive to said second type of movement of said body for providing a second relative movement in accordance therewith,
   (4) said gyroscopic means forming a portion of said inertial mass, and
   (5) second pick-off means having one portion connected to said inertial mass and responsive to said second relative movement for providing a signal in accordance with said second type of movement.

2. Gyroscopic apparatus for measuring rotation and translation of a body comprising,
   (1) gyroscopic means mounted on and responsive to rotation of said body for providing a first relative movement in accordance therewith,
   (2) first pick-off means having one portion connected to said gyroscopic means and responsive to said first relative movement for providing a signal representative of said rotation,
   (3) means including an inertial mass mounted on and responsive to said translation of said body for providing a second relative movement in accordance therewith,
   (4) said gyroscopic means forming a portion of said inertial mass, and
   (5) second pick-off means having one portion connected to said inertial mass and responsive to said second relative movement for providing a signal representative of the translation of said body.

3. Gyroscopic apparatus of the character described in claim 2 including electrical means coupled to said apparatus for varying the frequency response characteristics of said gyroscopic apparatus.

4. Gyroscopic apparatus of the character described in claim 2 including electrical means coupled to said gyroscopic means for varying the spin velocity of said gyroscopic means.

5. Gyroscopic apparatus for providing measures representative of the rate of angular movement and linear acceleration experienced by a body upon which it is mounted comprising,
   (1) gyroscopic means mounted on and responsive to said rate of angular movement of said body for precessing in accordance therewith,
   (2) first pick-off means having one portion connected to said gyroscopic means and responsive to said precession for providing a signal representative of the rate of said angular movement,
   (3) means including an inertial mass mounted on and responsive to the linear acceleration of said body for providing relative movement in accordance therewith,
   (4) said gyroscopic means forming a portion of said inertial mass, and
   (5) second pick-off means having one portion connected to said inertial mass and responsive to said relative movement for providing a signal representative of said linear acceleration.

6. Gyroscopic apparatus of the character described in claim 5 in which said gyroscopic means includes a single degree of freedom gyroscope.

7. Gyroscopic apparatus for measuring angular and linear movements of a body upon which it is mounted comprising,
   (1) a housing adapted to be mounted on said body,
   (2) a gyroscopic rotor mounted for spinning about a first axis within an inner casing,
   (3) an intermediate casing pivotally supported by first resilient means within said housing for movement in the direction of said first axis,
   (4) second resilient means resiliently restraining the movement of said intermediate casing within said housing in the direction of said first axis,
   (5) said inner casing having an outside diameter slightly less than the inside diameter of said intermediate casing and rotatably supported for limited movement within said intermediate casing about a second axis,
   (6) said first resilient means resiliently restraining the rotational movement of said inner casing around said second axis,
   (7) fluid means disposed between said inner and intermediate casings for viscously damping the movement of said inner casing,
   (8) said gyroscopic rotor being responsive to said angular movements of said body for providing relative movement between said inner casing and said intermediate casing in accordance therewith.
   (9) first pick-off means having one portion mounted for rotation with said inner casing and another cooperative portion mounted on said intermediate casing for providing a signal representative of the relative rotational movement therebetween, and
   (10) second pick-off means having one portion mounted on said intermediate casing and another cooperative portion mounted on said housing for providing a signal representative of the relative translational movement therebetween which is a measure of said linear movement experienced by said body in the direction of said first axis.

8. Gyroscopic apparatus of the character described in claim 7 including electrical means coupled to said gyroscopic rotor for varying the spin velocity of said gyroscopic rotor for varying the frequency response of said apparatus.

9. Gyroscopic apparatus of the character described in claim 7 including temperature regulating means connected to said apparatus for controlling the viscosity of said fluid means for controlling the frequency response of said apparatus.

10. Gyroscopic apparatus of the character described in claim 7 including electrical means coupled to said apparatus for varying the frequency response characteristics of said gyroscopic apparatus.

11. Gyroscopic apparatus for measuring angular and linear movements of a body upon which it is mounted comprising,
   (1) a housing adapted to be mounted on said body,
   (2) a gyroscopic rotor mounted for spinning about a first axis within a hollow cylindrical inner casing,
   (3) a hollow cylindrical intermediate casing positionably disposed by first resilient means within said housing for movement in the direction of said first axis,
   (4) second resilient means resiliently restraining the movement of said intermediate casing within said housing in the direction of said first axis,
   (5) said inner casing having an outside diameter slightly less than the inside diameter of said intermediate casing and rotatably supported for limited angular movement within said intermediate casing about a second axis,
   (6) said first resilient means being arranged to resiliently restrain the rotational movement of said inner casing around said second axis,
   (7) fluid means disposed between said inner and intermediate casings for at least partially floating said inner casing and for viscously damping the movement of said inner casing,
   (8) said gyroscopic rotor being responsive to said angular movements of said body for providing relative movement between said inner casing and said intermediate casing in accordance therewith,
   (9) first pick-off means having one portion mounted for rotation with said inner casing and another cooperative portion mounted on said intermediate casing for providing a signal representative of the relative rotational movement therebetween, and
   (10) second pick-off means having one portion mounted on said intermediate casing and another cooperative portion mounted on said housing for providing a signal representative of the relative translational movement therebetween which is a measure of said linear movement experienced by said body in the direction of said first axis, 12. Gyroscopic apparatus of the character described in claim 11 in which said first resilient means is a flat spring providing resilient restraint in the direction of the first axis and torsional restraint around the second axis, and said second resilient means are diametrically disposed helical springs connected between the intermediate casing and the housing.

13. Gyroscopic apparatus of the character described in claim 11 including electrical means coupled to said gyroscopic rotor for varying the spin velocity of said gyroscopic rotor for varying the frequency response of said apparatus.

14. Gyroscopic apparatus of the character described in claim 11 including temperature regulating means connected to said apparatus for controlling the viscosity of said fluid means for controlling the frequency response of said apparatus.

15. Gyroscopic apparatus of the character described in claim 11 including electrical means coupled to said apparatus for varying the frequency characteristics of said gyroscopic apparatus.

References Cited by the Examiner

UNITED STATES PATENTS

| | | | |
|---|---|---|---|
| 3,065,641 | 11/1962 | Stiles | 74—5 |
| 3,142,991 | 8/1964 | Pittman | 74—5.6 |

BROUGHTON G. DURHAM, *Primary Examiner.*

P. W. SULLIVAN, *Assistant Examiner.*